(12) United States Patent
Ren et al.

(10) Patent No.: US 11,003,243 B2
(45) Date of Patent: May 11, 2021

(54) CALIBRATION METHOD AND DEVICE, STORAGE MEDIUM AND PROCESSOR

(71) Applicant: BEIJING 7INVENSUN TECHNOLOGY CO., LTD., Beijing (CN)

(72) Inventors: Dongchun Ren, Beijing (CN); Wei Liu, Beijing (CN); Zhijiang Lou, Beijing (CN); Xiaohu Gong, Beijing (CN); Jian Wang, Beijing (CN); Fengmei Nie, Beijing (CN); Meng Yang, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/474,079

(22) PCT Filed: Oct. 31, 2018

(86) PCT No.: PCT/CN2018/112946
§ 371 (c)(1),
(2) Date: Jun. 27, 2019

(87) PCT Pub. No.: WO2019/085939
PCT Pub. Date: May 9, 2019

(65) Prior Publication Data
US 2020/0257357 A1 Aug. 13, 2020

(30) Foreign Application Priority Data
Nov. 1, 2017 (CN) .................. 201711061169.8

(51) Int. Cl.
*G06F 3/01* (2006.01)
*G06T 7/80* (2017.01)
*G06T 7/246* (2017.01)

(52) U.S. Cl.
CPC .............. *G06F 3/013* (2013.01); *G06T 7/246* (2017.01); *G06T 7/80* (2017.01)

(58) Field of Classification Search
CPC ............ G06F 3/013; G06T 7/80; G06T 7/246
See application file for complete search history.

(56) References Cited

U.S. PATENT DOCUMENTS

| 8,824,779 B1 | 9/2014 | Smyth |
| 2006/0239670 A1 | 10/2006 | Cleveland |

(Continued)

FOREIGN PATENT DOCUMENTS

| CN | 101506844 A | 8/2009 |
| CN | 101866215 A | 10/2010 |

(Continued)

OTHER PUBLICATIONS

Jin, Chun et al. "Estimation Method of the Fixation Point in Gaze Tracking System". Process Automation Inst R Umentation. Dec. 31, 2016 (Dec. 31, 2016). vol. 37 No. 5. pp. 32-35.

(Continued)

*Primary Examiner* — Edward Park
(74) *Attorney, Agent, or Firm* — Gang Yu (57) ABSTRACT

The disclosure discloses a calibration method and device, a storage medium and a processor. The method includes that: a calibration point is controlled to move on a predetermined motion track; a gaze track of a target object is acquired in a movement process of the calibration point; and a specified parameter is calibrated according to the predetermined motion track and the gaze track, the specified parameter is configured to predict a gaze point of the target object.

14 Claims, 4 Drawing Sheets

(56) References Cited

U.S. PATENT DOCUMENTS

| | | | | |
|---|---|---|---|---|
| 2009/0196460 | A1* | 8/2009 | Jakobs | G06F 3/013 382/103 |
| 2013/0114043 | A1* | 5/2013 | Balan | A61B 3/113 351/210 |
| 2015/0049013 | A1* | 2/2015 | Rahman | G06F 3/011 345/156 |
| 2015/0339098 | A1* | 11/2015 | Lee | G06F 3/167 715/728 |
| 2017/0064209 | A1* | 3/2017 | Cohen | H04N 5/2257 |
| 2017/0169658 | A1* | 6/2017 | Froy | G07F 17/3211 |
| 2017/0364149 | A1* | 12/2017 | Lu | G06F 3/013 |
| 2018/0007328 | A1* | 1/2018 | Kursula | H04N 9/3194 |
| 2020/0257357 | A1* | 8/2020 | Ren | G06F 3/013 |

FOREIGN PATENT DOCUMENTS

| | | |
|---|---|---|
| CN | 102662476 A | 9/2012 |
| CN | 102708358 A | 10/2012 |
| CN | 103761519 A | 4/2014 |
| CN | 104750232 A | 7/2015 |
| CN | 104898823 A | 9/2015 |
| CN | 105827407 A | 8/2016 |
| CN | 106462733 A | 2/2017 |
| CN | 106537290 A | 3/2017 |
| CN | 106662917 A | 5/2017 |
| CN | 106778641 A | 5/2017 |
| CN | 107003721 A | 8/2017 |
| CN | 108038884 A | 5/2018 |

OTHER PUBLICATIONS

Ren, Dongchun et al. "A Gaze Estimation Method Based on Normalized Eye Image". Acta Electronica Sinica. Mar. 31, 2015 (Mar. 31, 2015). vol. 43 No. 3. pp. 536-543.

Zhang, Chuang et al. "A Novel Eye Gaze Tracking Technique Based on Pupil Center Cornea Reflection Technique". Chinese Journal of Conputers. Jul. 31, 2010 (Jul. 31, 2010). vol. 33 No. 7. pp. 1272-1285.

Jian-Gang Wang et al. "Estimating the eye gaze from one eye". Computer Vision and Image Understanding. Apr. 30, 2005 (Apr. 30, 2005). vol. 98 No. 1. pp. 83-103.

* cited by examiner

CALIBRATION METHOD AND DEVICE, STORAGE MEDIUM AND PROCESSOR

CROSS-REFERENCE TO RELATED APPLICATIONS

The present application claims benefit of Chinese Patent Application No. 201711061169.8, submitted to the Patent Office of the People's Republic of China on Nov. 1, 2017, and entitled "Calibration Method and Device, Storage Medium and Processor", the contents of which are hereby incorporated by reference in its entirety.

TECHNICAL FIELD

The embodiments of the disclosure relate to the technical field of information, and particularly to a calibration method and device, a storage medium and a processor.

BACKGROUND

In an existing gaze estimation method, a manner usually adopted is to estimate a gaze point by use of a 3-Dimensional (3D) approximately spherical model of an eyeball and a light refraction and reflection principle.

According to the method, a pupil center position v in an image and positions $u_1$ and $u_2$ of two infrared glints are detected to estimate a gaze point position g, where a relationship between g and each of v, $u_1$ and $u_2$ may be represented by a formula $g=f_{R,K,\alpha,\beta,\,n_1}(v,u_1,u_2)$.

In the formula, R is a radius of curvature of a cornea, K is a distance between a center of the eyeball and a center of curvature of the cornea, $n_1$ is a refractive index of aqueous humor and the cornea, and $\alpha$ and $\beta$ are two compensation angles in a gazing direction. For different people, parameters such as R, K, $n_1$, $\alpha$ and $\beta$ are different. Therefore, an eye tracking device is required to perform parameter calibration before use.

A common manner for a parameter calibration process before the eye tracking device is used is to arrange multiple calibration points for calibration. Herein, the number of the calibration points is usually 9 or 15. However, if the 9 or 15 calibration points are adopted for calibration, the calibration process is relatively high in time consumption and inconvenient for most users.

For example, if calibration time of three seconds is required by each calibration point, calibration time of totally 27 seconds or 45 seconds is required to be consumed. If the number of the calibration points is reduced, the problem of poor calibration effect caused by insufficient training samples may be brought. In addition, another problem of the calibration method based on the 9 points or the 15 points is that these calibration points are mutually independent and, once some calibration points are greatly deviated, it is impossible to detect them by use of position information of the other calibration points.

For a problem of incapability of an existing calibration manner in rapid calibration, no effective solution has been provided yet.

SUMMARY

According to one aspect of the embodiments of the disclosure, a calibration method is provided, which includes that: a calibration point is controlled to move on a predetermined motion track; a gaze track of a target object is acquired in a movement process of the calibration point; and a specified parameter is calibrated according to the predetermined motion track and the gaze track, the specified parameter is configured to predict a gaze point of the target object.

In an alternative embodiment, the operation that the gaze track of the target object is acquired in the movement process of the calibration point includes that: a pupil center position and a glint center position on an eyeball are acquired in the movement process of the calibration point; and the gaze track of the target object is determined according to the pupil center position and the glint center position.

In an alternative embodiment, the operation that the pupil center position of the target object and the glint center position on the eyeball are acquired in the movement process of the calibration point includes that: an eye image of the target object is acquired at a predetermined time interval in the movement process of the calibration point, the eye image including a pupil and a glint; and the pupil center position and the glint center position are extracted from the eye image.

In an alternative embodiment, the operation that the gaze track of the target object is determined according to the pupil center position and the glint center position includes that: positions of multiple gaze points of a gaze of the target object are obtained through a gaze calculation formula according to the pupil center position and the glint center position; an average value and standard deviation of the positions of the multiple gaze points are calculated; multiple gaze points of which the positions are three standard deviations smaller than the average value are selected as first reference points; and the gaze track is determined according to the positions of the first reference points.

In an alternative embodiment, under the condition that the predetermined motion track is a circumferential locus, the gaze track is also a circumferential locus, and the operation that the gaze track is determined according to the first reference points includes that: a first radius and first circle center position of the circumferential locus are determined according to the first reference points; and the gaze track is determined according to the first radius and first circle center position of the circumferential locus.

In an alternative embodiment, the operation that the first radius and first circle center position of the circumferential locus are determined according to the first reference points includes that: a circumferential locus formula is determined, wherein the circumferential locus formula is $(x_i-x_0')^2+(y_i-y_0')^2=r'^2$, the first circle center position is $O'=[x_0',y_0']$, the first radius is $r'$, the first reference point meets the circumferential locus formula, and a coordinate of the first reference point is $(x_i,y_i)$; a first matrix and a second matrix are determined according to the circumferential locus formula, wherein the circumferential locus formula may be converted into $[1,-2x_{i'},-2y_{i'}][x_0'^2+y_0'^2-r'^2,x_0',y_0']^T=-x_{i'}^2-y_{i'}^2$ the first matrix is $$A = \begin{bmatrix} \vdots \\ 1, -2x_{i'}, -2y_{i'} \\ \vdots \end{bmatrix},$$

and the second matrix is $$B = \begin{bmatrix} \vdots \\ -2x_{i'}^2, -2y_{i'}^2 \\ \vdots \end{bmatrix};$$

and the first radius and first circle center position of the circumferential locus are determined by use of a least square method according to the first matrix and the second matrix, where $[x_0'^2+y_0'^2-r'^2,x_0',y_0']^T=(A^TA)^{-1}A^TB$.

In an alternative embodiment, after the operation that the first radius and first circle center position of the circumferential locus are determined according to the first reference points, the method further includes that: distances between the multiple first reference points and the circumferential locus and a distance average value and distance standard deviation of the distances are calculated; multiple first reference points of which the distances are smaller than three distance standard deviations than the distance average value are selected as second reference points; and a second radius and second circle center position of the circumferential locus are determined by taking the second reference points as the first reference points.

In an alternative embodiment, the operation that the specified parameter is calibrated according to the predetermined motion track and the gaze track includes that: the specified parameter is regulated; and the gaze track is determined according to the regulated specified parameter, the gaze track determined by the regulated specified parameter is matched with the predetermined motion track.

In an alternative embodiment, the operation that the specified parameter is regulated includes at least one of the following operations: a radius of curvature R of a cornea is regulated; a distance K between a center of the eyeball and a center of curvature of the cornea is regulated; a refractive index $n_1$ of aqueous humor and the cornea is regulated; and two compensation angles α and β in a gazing direction are regulated.

According to another aspect of the embodiments of the disclosure, a calibration device is also provided, which includes: a control component, configured to control a calibration point to move on a predetermined motion track; an acquisition component, configured to acquire a gaze track of a target object in a movement process of the calibration point; and a calibration component, configured to calibrate a specified parameter according to the predetermined motion track and the gaze track, the specified parameter is configured to predict a gaze point of the target object.

According to another embodiment of the disclosure, a storage medium is also provided, which includes a stored program, the program running to execute any abovementioned method.

According to another embodiment of the disclosure, a processor is also provided, which is configured to run a program, the program running to execute any abovementioned method.

BRIEF DESCRIPTION OF THE DRAWINGS

The drawings described here are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION OF THE EMBODIMENTS

In order to make those skilled in the art understand the solutions of the disclosure better, the technical solutions in the embodiments of the disclosure will be clearly and completely described below in combination with the drawings in the embodiments of the disclosure. It is apparent that the described embodiments are not all embodiments but only a part of the embodiments of the disclosure. All other embodiments obtained by those of ordinary skill in the art on the basis of the embodiments in the disclosure without creative work shall fall within the scope of protection of the disclosure.

It is to be noted that terms "first", "second" and the like in the specification, claims and drawings of the disclosure are adopted not to describe a specific sequence or order but to distinguish similar objects. It should be understood that data used like this may be exchanged under a proper condition for implementation of the embodiments of the disclosure described here in sequences besides those shown or described herein. In addition, terms "include" and "have" and any transformation thereof are intended to cover non-exclusive inclusions. For example, a process, method, system, product or device including a series of steps or components is not limited to those clearly listed steps or components, but may include other steps or components which are not dearly listed or inherent in the process, the method, the system, the product or the device.

According to the embodiments of the disclosure, a calibration method embodiment is provided. It is to be noted that the steps shown in the flowchart of the drawings may be executed in a computer system like a set of computer executable instructions, and moreover, although a logic sequence is shown in the flowchart, the shown or described steps may be executed in a sequence different from that described here under some conditions.

Figure 1:
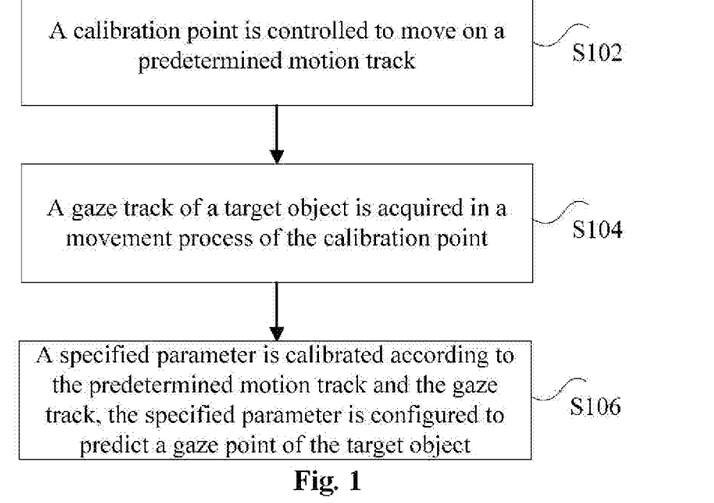
FIG. 1 is a flowchart of a calibration method according to an embodiment of the disclosure.

FIG. 1 is a flowchart of a calibration method according to an embodiment of the disclosure. As shown in FIG. 1, the method includes the following steps.

In S102, a calibration point is controlled to move on a predetermined motion track.

In S104, a gaze track of a target object is acquired in a movement process of the calibration point.

In S106, a specified parameter is calibrated according to the predetermined motion track and the gaze track, the specified parameter is configured to predict a gaze point of the target object.

Through the steps, the calibration point is controlled to move on the predetermined motion track, the gaze track formed in a manner that the target object gazes at the calibration point is acquired in the movement process of the calibration point, and then the specified parameter configured to predict the gaze point of the target object is calibrated according to the predetermined motion track of the calibration point and the gaze track of the target object, so that the specified parameter configured to predict the gaze point of the target object may be accurately obtained by calibrating the locus only once, calibration time is effectively reduced, a calibration speed is increased, and the technical problem of incapability of an existing calibration manner in rapid calibration is further solved.

In S102, the predetermined motion track of the calibration point may be a complex locus such as an elliptical locus, a triangular locus and a square locus.

In S102, the calibration point may move on the predetermined motion track, and may also be displayed at an interval of a predetermined distance on the predetermined motion track.

In S104, a gaze of the target object may move along with movement of the calibration point in the movement process of the calibration point. When the gaze track of the target object is acquired, a theoretical value of the gaze track of the target object may be calculated.

In S106, the specified parameter capable of matching the predetermined motion track and the gaze track may be determined as a calibrated parameter, so that the gaze point of the target object may be predicted according to the calibrated specified parameter.

Optionally, matching of the predetermined motion track and the gaze track includes overlapping of the predetermined motion track and the gaze track.

In the embodiment, the gaze track of the target object may include multiple gaze points of the target object, and under the condition that the multiple gaze points of the target object are fitted with the predetermined motion track, the specified parameter capable of fitting the multiple gaze points and the predetermined motion track is determined as the calibrated specified parameter.

As an optional embodiment, the operation that the gaze track of the target object is acquired in the movement process of the calibration point includes that: a pupil center position and a glint center position on an eyeball are acquired in the movement process of the calibration point; and the gaze track of the target object is determined according to the pupil center position and the glint center position.

With adoption of the embodiment of the disclosure, when the gaze track of the target object is acquired in the movement process of the calibration point, the pupil center position of the target object and the glint center position on the eyeball may be acquired to calculate the theoretical value of the gaze track of the target object, thereby completing acquisition of the gaze track of the target object.

It is to be noted that a glint on the eyeball of the target object may be a glint formed by mapping infrared light emitted by an infrared device onto the eyeball of the target object in a calibration process. Herein, two infrared devices are usually adopted to map two glints on the eyeball of the target object in the calibration process.

As an optional embodiment, the operation that the pupil center position of the target object and the glint center position on the eyeball are acquired in the movement process of the calibration point includes that: an eye image of the target object is acquired at a predetermined time interval in the movement process of the calibration point, the eye image including a pupil and a glint; and the pupil center position and the glint center position are extracted from the eye image.

With adoption of the embodiment of the disclosure, the eye image of the target object is acquired at the predetermined time interval in the movement process of the calibration process, and the pupil center position of the target object and the glint center position on the eyeball are extracted from the eye image of the target object, so that the gaze track of the target object may be calculated according to the accurately extracted pupil center position and glint center position on the eyeball.

As an optional embodiment, the operation that the gaze track of the target object is determined according to the pupil center position and the glint center position includes that: positions of multiple gaze points of a gaze of the target object are obtained through a gaze calculation formula according to the pupil center position and the glint center position; and the gaze track is determined according to the positions of the multiple gaze points.

With adoption of the embodiment of the disclosure, after the pupil center position and the glint center position are determined, the positions of the multiple gaze points that the gaze of the target object reaches may be calculated through the gaze calculation formula, and then the gaze track of the target object may be accurately determined according to the calculated positions of the multiple gaze points.

Optionally, the gaze calculation formula may be $g_i=[x_i, y_i]=f_{R,K,\alpha,\beta,n_1}(v_i,u_{1i},u_{2i})$, where R is a radius of curvature of a cornea, K is a distance between a center of the eyeball and a center of curvature of the cornea, $n_1$ is a refractive index of aqueous humor and the cornea, $\alpha$ $\beta$ are two compensation angles in a gazing direction, $v_i$ is the pupil center position, $u_{1i}$ and $u_{2i}$ are glint center positions of the two glints on the eyeball, and $g_i$ is the position of the gaze point of the target object. The pupil center position and the glint center positions of the two glints on the eyeball may be substituted into the gaze calculation formula to obtain the positions of the gaze points of the target object.

Optionally, multiple test points may be fitted to obtain the gaze track.

It is to be noted that fitting refers to connecting a series of points on a plane by use of a smooth curve.

As an optional embodiment, the operation that the gaze track of the target object is determined according to the positions of the multiple gaze points includes that: an average value and standard deviation of the positions of the multiple gaze points are calculated; multiple gaze points of which the positions are three standard deviations smaller than the average value are selected as first reference points; and the gaze track is determined according to the positions of the first reference points.

With adoption of the embodiment of the disclosure, after the multiple gaze points of the target object are obtained, the average value and standard deviation of the positions of the multiple gaze points are calculated, then the multiple gaze points of which the positions are three standard deviations smaller than the average value are selected as the first reference points according to the calculated average value and standard deviation, and then the gaze track of the target object is determined according to the positions of the first reference points, so that the obtained gaze track may be more accurate, interference bad points in the multiple gaze points may also be eliminated, a bad point elimination speed is increased, and the calibration speed is further increased.

As an optional embodiment, under the condition that the predetermined motion track is a circumferential locus, the gaze track is also a circumferential locus, and the operation that the gaze track is determined according to the first reference points includes that: a first radius and first circle center position of the circumferential locus are determined according to the first reference points; and the gaze track is determined according to the first radius and first circle center position of the circumferential locus.

With adoption of the embodiment of the disclosure, under the condition that the predetermined motion track is the circumferential locus, the gaze track of the target object should also be a circumferential locus, so that the gaze track of the target object may be determined according to the first circle center position and first radius of the circumferential locus corresponding to the gaze track in a process of determining the gaze track according to the first reference points.

As an optional embodiment, the operation that the first radius and first circle center position of the circumferential locus are determined according to the first reference points includes that: a circumferential locus formula is determined, wherein the circumferential locus formula is $(x_i-x_0')^2+(y_i-y_0')^2=r'^2$, the first circle center position is $O'=[x_0',y_0']$, the first radius is r', the first reference point meets the circumferential locus formula, and a coordinate of the first reference point is $(x_{i'},y_{i'})$; a first matrix and a second matrix are determined according to the circumferential locus formula, wherein the circumferential locus formula may be converted into $[1,-2x_{i'},-2y_{i'}][x_0'^2+y_0'^2-r'^2,x_0',y_0']^T=-x_{i'}^2-y_{i'}^2$, the first matrix is $$A = \begin{bmatrix} \vdots \\ 1, -2x_{i'}, -2y_{i'} \\ \vdots \end{bmatrix},$$

and the second matrix is $$B = \begin{bmatrix} \vdots \\ -2x_{i'}^2, -2y_{i'}^2 \\ \vdots \end{bmatrix};$$

and the first radius and first circle center position of the circumferential locus are determined by use of a least square method according to the first matrix and the second matrix, where $[x_0'^2+y_0'^2-r'^2,x_0',y_0']^T=(A^TA)^{-1}A^TB$.

With adoption of the embodiment of the disclosure, under the condition that the predetermined motion track is a circumferential locus, the gaze track of the target object should also be a circumferential locus, and then the gaze track of the target object is consistent with the circumferential locus formula $(x_i-x_0')^2+(y_i-y_0')^2=r'^2$. Herein, the first circle center position is $O'=[x_0',y_0']$, the first radius is r', the first reference point meets the circumferential locus formula, and the coordinate of the first reference point is $(x_{i'},y_{i'})$. The circumferential locus formula is converted to obtain a converted formula $[1,-2x_{i'},-2y_{i'}][x_0'^2+y_0'^2-r'^2,x_0',y_0']^T=-x_{i'}^2-y_{i'}^2$, where $[x_0'^2+y_0'^2-r'^2,x_0',y_0']^T$ is a transposed matrix of $[x_0'^2+y_0'^2-r'^2,x_0',y_0']$. The first matrix and the second matrix are set according to the converted formula. Herein, the first matrix is $$A = \begin{bmatrix} \vdots \\ 1, -2x_{i'}, -2y_{i'} \\ \vdots \end{bmatrix},$$

and the second matrix is $$B = \begin{bmatrix} \vdots \\ -x_{i'}^2, -y_{i'}^2 \\ \vdots \end{bmatrix}.$$

The first matrix and the second matrix may be determined to be consistent with the formula $[x_0'^2+y_0'^2-r'^2,x_0',y_0']^T=(A^TA)^{-1}A^TB$ through the least square method, and the formula may further be solved to obtain the first radius and first circle center position of the gaze track of the target object.

According to the embodiment of the disclosure, under the condition that the first radius and the first circle center position are matched with a radius and circle center position of the predetermined motion track, it may be determined that the gaze track is matched with the predetermined motion track; and under the condition that the first radius and the first circle center position are mismatched with the radius and circle center position of the predetermined motion track, it may be determined that the gaze track is mismatched with the predetermined motion track.

As an optional embodiment, after the operation that the first radius and first circle center position of the circumferential locus are determined according to the first reference points, the embodiment further includes that: distances between the multiple first reference points and the circumferential locus and a distance average value and distance standard deviation of the distances are calculated; multiple first reference points of which the distances are smaller than three distance standard deviations than the distance average value are selected as second reference points; and a second radius and second circle center position of the circumferential locus are determined by taking the second reference points as the first reference points.

With adoption of the embodiment of the disclosure, after the first radius and first circle center position of the circumferential locus are determined according to the first reference points, the distances between the multiple first reference points and the circumferential locus and the distance average value and distance standard deviation of the distances are calculated, then the multiple first reference points of which the distances are three distance standard deviations smaller than the distance average value are selected as the second reference points according to the distance average value and distance standard deviation of the distances, and the second radius and second circle center position of the circumferential locus corresponding to the second reference points are obtained again by taking the second reference points as the first reference points in a manner of determining the first radius and first circle center position of the circumferential locus according to the first reference points, so that the gaze track of the target object may be determined more accurately by selecting the second reference points more accurate than the first reference points and calculating the second radius and second circle center position of the circumferential locus of the target object according to the second reference points.

As an optional embodiment, the operation that the specified parameter is calibrated according to the predetermined motion track and the gaze track includes that: the specified parameter is regulated; and the gaze track is determined according to the regulated specified parameter, the gaze track determined by the regulated specified parameter is matched with the predetermined motion track.

With adoption of the embodiment of the disclosure, the specified parameter is regulated to match the gaze track of the target object and the predetermined motion track of the calibration point, and then the specified parameter capable of matching the gaze track of the target object and the predetermined motion track of the calibration point may be determined as the calibrated specified parameter, thereby completing calibration of the specified parameter.

As an optional embodiment, the operation that the specified parameter is regulated includes at least one of the following operations: a radius of curvature R of a cornea is regulated; a distance K between a center of the eyeball and a center of curvature of the cornea is regulated; a refractive index $n_1$ of aqueous humor and the cornea is regulated; and two compensation angles α and β in a gazing direction are regulated.

With adoption of the embodiment of the disclosure, the radius of curvature of the cornea, the distance between the center of the eyeball and the center of curvature of the cornea, the refractive index of the aqueous humor and the cornea and the two compensation angles α and β in the gazing direction may be regulated to make the regulated specified parameter more consistent with an eyeball structure of the target object, so that the gaze points or gaze track of the target object may be determined accurately by use of the regulated specified parameter.

As an optional embodiment, the operation that the specified parameter is regulated includes that: the specified parameter is updated, then the gaze track is determined by use of the updated specified parameter, whether the gaze track after each updating is matched with the predetermined motion track or not is judged, and under the condition that the gaze track is matched with the predetermined motion track, the specified parameter corresponding to the gaze track is determined as the calibrated specified parameter.

Optionally, under the condition that the predetermined motion track is a circumferential locus, the gaze track of the target object should also be a circumferential locus, and then the specified parameter is updated in the following manners:

$$R = R' - \frac{(r'-r)}{1000},$$

where R' is the radius of curvature R of the cornea in the specified parameter updated last time;

$$K = K' + \frac{(r'-r)}{1000},$$

where K' is the distance K between the center of the eyeball and the center of curvature of the cornea in the specified parameter updated last time;

$$\alpha = \alpha' - \frac{x'_0 - x_0}{1000},$$

where α' is the compensation angle α in the gazing direction in the specified parameter updated last time; and $$\beta = \beta' - \frac{y'_0 - y_0}{1000},$$

where β' is the compensation angle β in the gazing direction in the specified parameter updated last time.

The disclosure also provides a preferred embodiment. The preferred embodiment provides a locus-based gaze estimation parameter calibration method.

According to the locus-based gaze estimation parameter calibration method provided in the disclosure, the problems of excessive calibration points required by parameter calibration and high parameter calibration time consumption may be solved.

The locus-based gaze estimation parameter calibration method provided in the disclosure is independent of calibration of a single point, and instead, a motion track (for example, a circular ring) is predetermined, and a calibration point is controlled to move on the predetermined motion track. Finally, R, K, $n_1$, α and β are regulated to position gaze estimation points (gaze points or gaze track) on the locus. Under a normal condition, only several minutes are required by movement of the calibration point for a circle around the circular ring, so that calibration time is greatly reduced by the method. In addition, since all gaze points move on the same locus, bad points deviated relatively far away from the motion track may be detected and eliminated.

The locus-based gaze estimation parameter calibration method provided in the disclosure will be introduced now with the condition that the predetermined motion track is a circular ring as an example.

Figure 2:
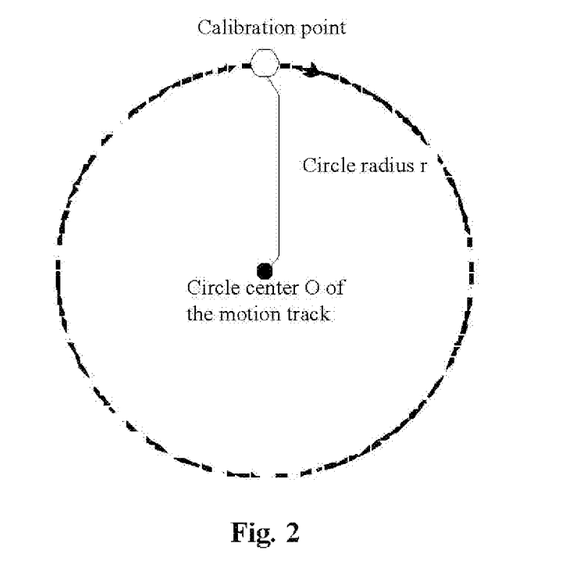
FIG. 2 is a schematic diagram of a predetermined motion track according to an embodiment of the disclosure.

FIG. 2 is a schematic diagram of a predetermined motion track according to an embodiment of the disclosure. As shown in FIG. 2, the predetermined motion track of the calibration point is set to be a circular ring (circular track), both of a Circle center O of the motion track $O=[x_0, y_0]$ and radius r of the circular ring is known.

A tester (target object) gazes at the moving calibration point until the calibration point completes moving for a circle. In a movement process of the calibration point, totally N eye images of the tester (target object) are acquired, and a pupil center $v_i$ and glint center positions $u_{1i}$ and $u_{2i}$ in each eye image are determined, where $i=1,2,\ldots,N$.

The parameters (specified parameters) R, K, $n_1$, α and β are calibrated to right position gaze estimation points (gaze points of the target object) $g_i$ on the set circumferential locus. Herein, the gaze estimation points (gaze points of the target object) $g_i$ are consistent with a formula $g_i=[x_i,y_i]=f_{R,K,\alpha,\beta,n_1}(v_i,u_{1i},u_{2i})$, R is a radius of curvature of a cornea, K is a distance between a center of an eyeball and a center of curvature of the cornea, $n_1$ is a refractive index of aqueous humor and the cornea, α and β are two compensation angles in a gazing direction, $v_i$ is the pupil center position, and $u_{1i}$ and $u_{2i}$ are the glint center positions of the two glints on the eyeball.

It is to be noted that $n_1$ may be set to be a constant value because $n_1$ is just a little different and may not bring obvious influence, and if convergence of the parameters (specified parameters) R, K, $n_1$, α and β may not be implemented through subsequent Step 1 to Step 5, a value of $n_1$ may be properly modified within a normal parameter range. For example, $n_1$ may be increased or decreased within a range of 1.1-1.4.

The locus-based gaze estimation parameter calibration method specifically includes the following steps.

In Step 1, initial values of R, K, α and β are set, the gaze estimation points (gaze points of the target object) $g_i=[x_i, y_i]=f_{R,K,\alpha,\beta,n_1}(v_i,u_{1i},u_{2i})$ is determined, and an average value $$\mu = \frac{1}{N}\sum_{i=1}^{N} g_i$$

and standard deviation $$\sigma = \sqrt{\frac{1}{N-1}\sum_{i=1}^{N}(g_i - \mu)^2}$$

of $g_i$ are simultaneously calculated. $g_i$ within a range of $[\mu-3\sigma,\mu+3\sigma]$ is selected as a normal sample set $\Omega=\{g_{i'}=[x_{i'},y_{i'}]\}$, where i' is M normal samples, and other points are temporally not used as bad points.

In Step 2, a circle radius and circle center position of data in the set $\Omega$. If the circle center position is $O'=[x_0',y_0']$ and the radius is r', $(x_{i'}-x_0')^2+(y_{i'}-y_0')^2=r'^2$, and the formula may be converted into:
$(x_{i'}-x_0')^2+(y_{i'}-y_0')^2=r'^2 x_0'^2+y_0'^2-r'^2-2x_{i'}x_0'-2y_{i'}y_0'=-x_{i'}^2$, $y_{i'}^2 [1,-2x_{i'},-2y_{i'}][x_0'^2+y_0'^2-r'^2,x_0',y_0']^T=-x_{i'}^2-y_{i'}^2$, so that all of the gaze points $g_{i'}$ determined as normal samples in the set $\Omega$ meet the formula.

It is set that $$A = \begin{bmatrix} \vdots \\ 1, -2x_{i'}, -2y_{i'} \\ \vdots \end{bmatrix}, B = \begin{bmatrix} \vdots \\ -x_{i'}^2 - y_{i'}^2 \\ \vdots \end{bmatrix},$$

and then $[x_0'^2+y_0'^2-r'^2,x_0',y_0']^T=(A^TA)^{-1}A^TB$ may be calculated by use of a least square method, so that the circle center position $O'=[x_0',y_0']$ and the radius r' may be solved.

In Step 3, distances $D_i=\|g_i-O'\|\_r'$ between all of the gaze points $g_i$ and a circle are calculated, and an average value $$\mu = \frac{1}{N}\sum_{i=1}^{N} D_i$$

and standard deviation $$\sigma = \sqrt{\frac{1}{N-1}\sum_{i=1}^{N}(D_i-\mu)^2}$$

of $D_i$ are simultaneously calculated. $g_i$ within the range of $[\mu-3\sigma,\mu+3\sigma]$ is selected to form a normal sample set $\Omega=\{g_{i'}=[x_{i'},y_{i'}]\}$ according to a $3\sigma$ principle, and the other points are temporally not used as bad points. Step 2 is repeated to estimate a circle center position $O'=[x_0',y_0']$ and the radius r', and then Step 4 is executed.

In Step 4, the parameters R, K, α and β are updated. Herein, $$R = R' - \frac{(r'-r)}{1000},$$

and R' is a radius of curvature R of a cornea in the specified parameter updated last time;

$$K = K' + \frac{(r'-r)}{1000},$$

and K' is a distance K between a center of an eyeball and a center of curvature of the cornea in the specified parameter updated last time;

$$\alpha = \alpha' - \frac{x_0'-x_0}{1000},$$

and α' is a compensation angle α in a gazing direction in the specified parameter updated last time; and $$\beta = \beta' - \frac{y_0'-y_0}{1000},$$

and β' is a compensation angle β in the gazing direction in the specified parameter last time.

It is to be noted that a specific updating form for the parameters R, K, α and β is also related to selection of a specific form of $g_i=f_{R,K,\alpha,\beta, n_1}(v,u_1,u_2)$, a reference system and the like and is required to be corresponding modified according to a practical condition.

In Step 5, Steps 2 to 4 are repeated until R, K, α and β meet a convergence requirement or the number of updating times reaches a set upper limit (for example, a set number of times is met or set accuracy is met).

Figure 3:
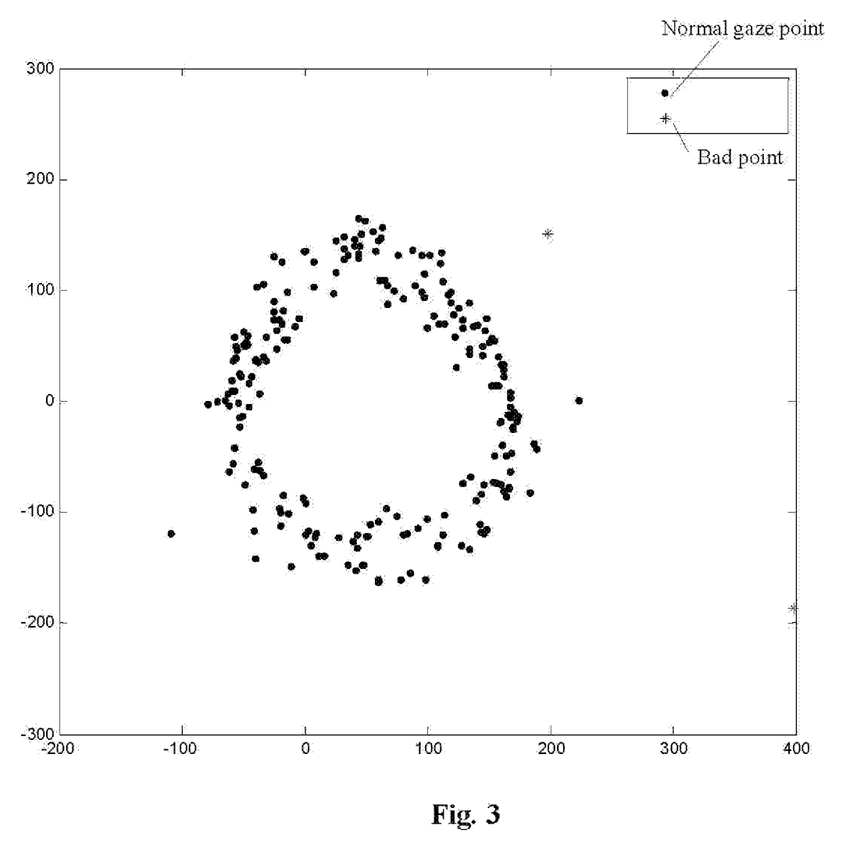
FIG. 3 is a schematic diagram of bad point detection and elimination processing in Step 1 over original data according to an embodiment of the disclosure.

FIG. 3 is a schematic diagram of bad point detection and elimination processing in Step 1 over original data according to an embodiment of the disclosure. As shown in FIG. 1, relatively concentrated gaze points are determined as normal gaze points, and gaze points far away from a concentrated area are determined as bad points.

Figure 4:
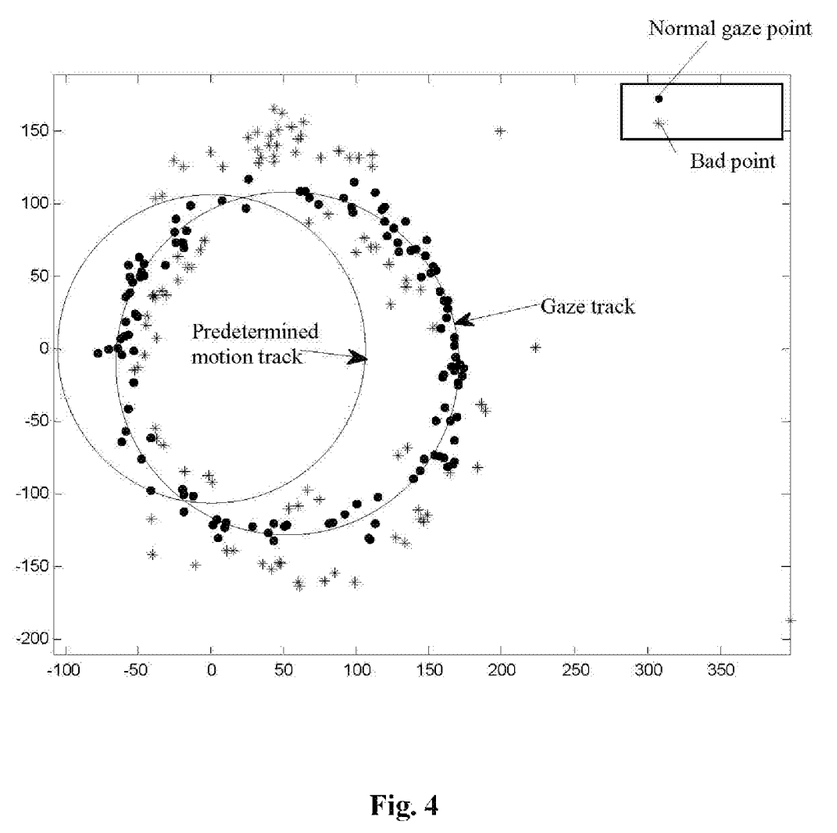
FIG. 4 is a schematic diagram of a circular locus of data fitted by a method of Steps 2 to 4 according to an embodiment of the disclosure.

FIG. 4 is a schematic diagram of a circular locus of data fitted by a method of Steps 2 to 4 according to an embodiment of the disclosure. As shown in FIG. 4, the distances $D_i=\|g_i-O'\|\_r'$ between all of the gaze points $g_i$ and the circle are calculated, and the average value $$\mu = \frac{1}{N}\sum_{i=1}^{N} D_i$$

and standard deviation $$\sigma = \sqrt{\frac{1}{N-1}\sum_{i=1}^{N}(D_i-\mu)^2}$$

of $D_i$ are simultaneously calculated. $g_i$ within the range of $[\mu-3\sigma,\mu+3\sigma]$ is selected to form the normal sample set $\Omega=\{g_{i'}=[x_{i'},y_{i'}]\}$ according to the $3\sigma$ principle, and the other points are temporally not used as bad points. Then, a gaze track of the target object may be fitted according to the normal sample set $\Omega=\{g_{i'}=[x_{i'},y_{i'}]\}$, and the bad points relatively far away from the gaze track may be eliminated. However, since the parameters R, K, $n_1$, α and β are inaccurate, the fitted circular locus (gaze track) is deviated far away from the circular locus (predetermined motion track) of the real calibration point.

Figure 5:
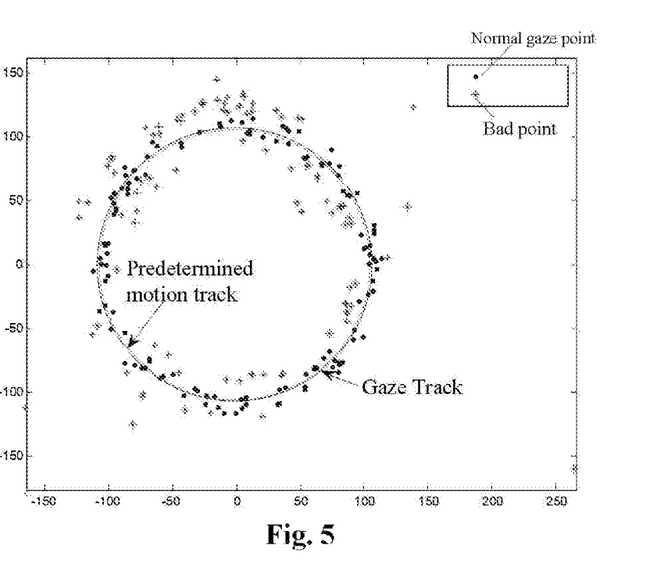
FIG. 5 is a schematic diagram of regulating a specified parameter to overlap a gaze track and a predetermined motion track according to an embodiment of the disclosure.

FIG. 5 is a schematic diagram of regulating a specified parameter to overlap a gaze track and a predetermined motion track according to an embodiment of the disclosure. As shown in FIG. 5, the parameters (specified parameters) R, K, $n_1$, α and β are regulated for many times, and the finally fitted circular locus (gaze track) is overlapped with the circular locus (predetermined motion track) of the real calibration point.

According to another aspect of the disclosure, an embodiment of the disclosure also provides a storage medium, which includes a stored program, the program running to control a device where the storage medium is located to execute the calibration method.

According to another aspect of the disclosure, an embodiment of the disclosure also provides a processor, which is configured to run a program, the program running to execute the calibration method.

According to an embodiment of the disclosure, a calibration device embodiment is also provided. It is to be noted that the calibration device may be configured to execute the calibration method in the embodiment of the disclosure. The calibration method in the embodiment of the disclosure may be executed in the calibration device.

Figure 6:
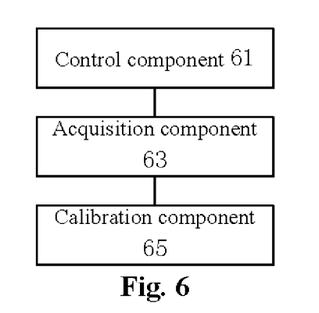
FIG. 6 is a schematic diagram of a calibration device according to an embodiment of the disclosure.

FIG. 6 is a schematic diagram of a calibration device according to an embodiment of the disclosure. As shown in FIG. 6, the device may include:

a control component 61, configured to control a calibration point to move on a predetermined motion track;

an acquisition component 63, configured to acquire a gaze track of a target object in a movement process of the calibration point; and a calibration component 65, configured to calibrate a specified parameter according to the predetermined motion track and the gaze track, the specified parameter is configured to predict a gaze point of the target object.

It is to be noted that the control component 61 in the embodiment may be configured to execute S102 in the embodiment of the application, the acquisition component 63 in the embodiment may be configured to execute S104 in the embodiment of the application and the calibration component 65 in the embodiment may be configured to execute S106 in the embodiment of the application. The modules implement an example and application scenario the same as those implemented by the corresponding steps but are not limited to the contents disclosed in the abovementioned embodiment.

In the embodiment of the disclosure, the calibration point is controlled to move on the predetermined motion track, the gaze track formed in a manner that the target object gazes at the calibration point is acquired in the movement process of the calibration point, and then the specified parameter configured to predict the gaze point of the target object is calibrated according to the predetermined motion track of the calibration point and the gaze track of the target object, so that the specified parameter configured to predict the gaze point of the target object may be accurately obtained by calibrating the locus only once, calibration time is effectively reduced, a calibration speed is increased, and the technical problem of incapability of an existing calibration manner in rapid calibration is further solved.

As an optional embodiment, the acquisition component includes: a first acquisition module, configured to acquire a pupil center position and a glint center position on an eyeball in the movement process of the calibration point; and a first determination module, configured to determine the gaze track of the target object according to the pupil center position and the glint center position.

As an optional embodiment, the first acquisition module includes: a second acquisition module, configured to acquire an eye image of the target object at a predetermined time interval in the movement process of the calibration point, the eye image including a pupil and a glint; and a first extraction module, configured to extract the pupil center position and the glint center position from the eye image.

As an optional embodiment, the first determination module includes: a first calculation module, configured to calculate positions of multiple gaze points of a gaze of the target object through a gaze calculation formula according to the pupil center position and the glint center position; and a second determination module, configured to determine the gaze track of according to the positions of the multiple gaze points.

As an optional embodiment, the second determination module includes: a second calculation module, configured to calculate an average value and standard deviation of the positions of the multiple gaze points; a first selection module, configured to select multiple gaze points of which the positions are three standard deviations smaller than the average value as first reference points; and a third determination module, configured to determine the gaze track according to the positions of the first reference points.

As an optional embodiment, under the condition that the predetermined motion track is a circumferential locus, the gaze track is also a circumferential locus, and the third determination module includes: a fourth determination module, configured to determine a first radius and first circle center position of the circumferential locus according to the first reference points; and a fifth determination module, configured to determine the gaze track according to the first radius and first circle center position of the circumferential locus.

As an optional embodiment, the fourth determination module includes: a sixth determination module, configured to determine a circumferential locus formula, wherein the circumferential locus formula is $(x_{i'}-x_0')^2+(y_{i'}-y_0')^2=r'^2$, the first circle center position is $O'=[x_0',y_0']$, the first radius is $r'$, the first reference point meets the circumferential locus formula, and a coordinate of the first reference point is $(x_{i'},y_{i'})$; a seventh determination module, configured to determine a first matrix and a second matrix according to the circumferential locus formula, wherein the circumferential locus formula $(x_{i'}-x_0)^2+(y_{i'}-y_0)^2=r'^2$ may be converted into $[1,-2x_{i'},-2y_{i'}][x_0'^2+y_0'^2-r'^2,x_0',y_0']^T=-x_{i'}^2-y_{i'}^2$, the first matrix is $$A = \begin{bmatrix} \vdots \\ 1, -2x_{i'}, -2y_{i'} \\ \vdots \end{bmatrix},$$

and the second matrix is $$B = \begin{bmatrix} \vdots \\ -x_{i'}^2 - y_{i'}^2 \\ \vdots \end{bmatrix};$$

and an eighth determination module, configured to determine the first radius and first circle center position of the circumferential locus by use of a least square method according to the first matrix and the second matrix, wherein $[x_0'^2+y_0'^2-r'^2,x_0',y_0']^T=(A^TA)^{-1}A^TB$.

As an optional embodiment, the embodiment further includes: a second calculation module, configured to, after the first radius and first circle center position of the circumferential locus are determined according to the first reference points, calculate distances between the multiple first reference points and the circumferential locus and a distance average value and distance standard deviation of the distances; a first selection module, configured to select multiple first reference points of which the distances are smaller than three distance standard deviations than the distance average value as second reference points; and a ninth determination module, configured to determine a second radius and second circle center position of the circumferential locus by taking the second reference points as the first reference points.

As an optional embodiment, the calibration component includes: a regulation module, configured to regulate the specified parameter; and a tenth determination module, configured to determine the gaze track according to the regulated specified parameter, the gaze track determined by the regulated specified parameter is matched with the predetermined motion track.

As an optional embodiment, the regulation module includes at least one of: a first regulation submodule, configured to regulate a radius of curvature R of a cornea; a second regulation submodule, configured to regulate a distance K between a center of the eyeball and a center of curvature of the cornea; a third regulation submodule, configured to regulate a refractive index $n_1$ of aqueous humor and the cornea; and a fourth regulation submodule, configured to regulate two compensation angles α and β in a gazing direction.

The sequence numbers of the embodiments of the disclosure are only adopted for description and do not represent superiority-inferiority of the embodiments.

In the embodiments of the disclosure, the descriptions of the embodiments focus on different aspects. The part which is not described in a certain embodiment in detail may refer to the related description of the other embodiments.

In some embodiments provided in the disclosure, it should be understood that the disclosed technical contents may be implemented in other manners. Herein, the device embodiment described above is only schematic. For example, division of the components is only division of logical functions, and other division manners may be adopted during practical implementation. For example, multiple components or components may be combined or integrated to another system, or some features may be ignored or are not executed. In addition, shown or discussed coupling, direct coupling or communication connection may be implemented through indirect coupling or communication connection of some interfaces, components or modules, and may be in an electrical form or other forms.

The components described as separate parts may or may not be separate physically, and parts displayed as components may or may not be physical components, that is, they may be located in the same place, or may also be distributed to multiple components. Part or all of the components may be selected to achieve the purpose of the solutions of the embodiments according to a practical requirement.

In addition, each functional component in each embodiment of the disclosure may be integrated into a processing component, each component may also physically exist independently, and two or more than two components may also be integrated into a component. The integrated component may be implemented in a hardware form and may also be implemented in form of software functional component.

If being implemented in form of software functional component and sold or used as an independent product, the integrated component may be stored in a computer-readable storage medium. Based on such an understanding, the technical solutions of the disclosure substantially or parts making contributions to the conventional art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a Read-Only Memory (ROM), a Random Access Memory (RAM), a mobile hard disk, a magnetic disk or an optical disk.

The above is only the preferred embodiment of the disclosure. It is to be pointed out that those of ordinary skill in the art may also make a number of improvements and embellishments without departing from the principle of the disclosure and these improvements and embellishments shall also fall within the scope of protection of the disclosure.

INDUSTRIAL APPLICABILITY

The solutions provided in the embodiments of the disclosure may be applied to a calibration process of a gaze point. Through the embodiments of the disclosure, the technical problem of incapability of an existing calibration manner in rapid calibration is solved, calibration time is effectively reduced, and a calibration speed is increased.

What is claimed is:

1. A calibration method, comprising:
controlling a calibration point to move on a predetermined motion track;
acquiring a gaze track of a target object in a movement process of the calibration point; and
calibrating a specified parameter according to the predetermined motion track and the gaze track, the specified parameter is configured to predict a gaze point of the target object;
wherein calibrating the specified parameter according to the predetermined motion track and the gaze track comprises: regulating the specified parameter; and determining the gaze track according to the regulated specified parameter, the gaze track determined by the regulated specified parameter is matched with the predetermined motion track;
wherein regulating the specified parameter comprises at least one of: regulating a radius of curvature R of a cornea; regulating a distance K between a center of the eyeball and a center of curvature of the cornea; regulating a refractive index $n_1$ of aqueous humor and the cornea; and regulating two compensation angles α and β in a gazing direction.

2. The method as claimed in claim 1, wherein acquiring the gaze track of the target object in the movement process of the calibration point comprises:
acquiring a pupil center position and a glint center position on an eyeball in the movement process of the calibration point; and
determining the gaze track of the target object according to the pupil center position and the glint center position.

3. The method as claimed in claim 2, wherein acquiring the pupil center position of the target object and the glint center position on the eyeball in the movement process of the calibration point comprises:
acquiring an eye image of the target object at a predetermined time interval in the movement process of the calibration point, the eye image comprises a pupil and a glint; and
extracting the pupil center position and the glint center position from the eye image.

4. The method as claimed in claim 3, wherein calibrating the specified parameter according to the predetermined motion track and the gaze track comprises:
regulating the specified parameter; and
determining the gaze track according to the regulated specified parameter, the gaze track determined by the regulated specified parameter is matched with the predetermined motion track.

5. The method as claimed in claim 2, wherein determining the gaze track of the target object according to the pupil center position and the glint center position comprises:
obtaining positions of multiple gaze points of a gaze of the target object through a gaze calculation formula according to the pupil center position and the glint center position;
calculating an average value and standard deviation of the positions of the multiple gaze points;
selecting multiple gaze points of which the positions are three standard deviations smaller than the average value as first reference points; and
determining the gaze track according to the positions of the first reference points.

6. The method as claimed in claim 5, wherein, under the condition that the predetermined motion track is a circumferential locus, the gaze track is also a circumferential locus, and determining the gaze track according to the first reference points comprises:
determining a first radius and first circle center position of the circumferential locus according to the first reference points; and
determining the gaze track according to the first radius and first circle center position of the circumferential locus.

7. The method as claimed in claim 6, wherein determining the first radius and first circle center position of the circumferential locus according to the first reference points comprises:
determining a circumferential locus formula, wherein the circumferential locus formula is $(x_i-x_0')^2+(y_i-y_0')^2=r'^2$, the first circle center position is $O'=[x_0',y_0']$, the first radius is $r'$, the first reference point meets the circumferential locus formula, and a coordinate of the first reference point is $(x_i,y_i)$;
determining a first matrix and a second matrix according to the circumferential locus formula, wherein the circumferential locus formula may be converted into $[1,-2x_{i'},-2y_{i'}][x_0'^2+y_0'^2-r'^2,x_0',y_0']^T=-x_{i'}^2-y_{i'}^2$, the first matrix is $$A = \begin{bmatrix} \vdots \\ 1, -2x_{i'}, -2y_{i'} \\ \vdots \end{bmatrix},$$

and the second matrix is $$B = \begin{bmatrix} \vdots \\ -x_{i'}^2 - y_{i'}^2 \\ \vdots \end{bmatrix};$$

and
determining the first radius and first circle center position of the circumferential locus by use of a least square method according to the first matrix and the second matrix, where $[x_0'^2+y_0'^2-r'^2,x_0',y_0']^T=(A^TA)^{-1}A^TB$.

8. The method as claimed in claim 7, after determining the first radius and first circle center position of the circumferential locus according to the first reference points, further comprising:
calculating distances between the multiple first reference points and the circumferential locus and a distance average value and distance standard deviation of the distances;
selecting multiple first reference points of which the distances are smaller than three distance standard deviations than the distance average value as second reference points; and
determining a second radius and second circle center position of the circumferential locus by taking the second reference points as the first reference points.

9. The method as claimed in claim 5, wherein calibrating the specified parameter according to the predetermined motion track and the gaze track comprises:
regulating the specified parameter; and
determining the gaze track according to the regulated specified parameter, the gaze track determined by the regulated specified parameter is matched with the predetermined motion track.

10. The method as claimed in claim 6, wherein calibrating the specified parameter according to the predetermined motion track and the gaze track comprises:
regulating the specified parameter; and
determining the gaze track according to the regulated specified parameter, the gaze track determined by the regulated specified parameter is matched with the predetermined motion track.

11. The method as claimed in claim 2, wherein calibrating the specified parameter according to the predetermined motion track and the gaze track comprises:
regulating the specified parameter; and
determining the gaze track according to the regulated specified parameter, the gaze track determined by the regulated specified parameter is matched with the predetermined motion track.

12. A non-transitory storage medium, comprising a stored program, the program running to execute the method as claimed in claim 1.

13. A calibration device, wherein the device has a hardware processor configured to execute program instructions stored on a memory, the program instructions comprise:
controlling a calibration point to move on a predetermined motion track;
acquiring a gaze track of a target object in a movement process of the calibration point; and
calibrating a specified parameter according to the predetermined motion track and the gaze track, the specified parameter is configured to predict a gaze point of the target object;
wherein calibrating the specified parameter according to the predetermined motion track and the gaze track comprises: regulating the specified parameter; and determining the gaze track according to the regulated specified parameter, the gaze track determined by the regulated specified parameter is matched with the predetermined motion track;
wherein regulating the specified parameter comprises at least one of: regulating a radius of curvature R of a cornea; regulating a distance K between a center of the eyeball and a center of curvature of the cornea; regulating a refractive index $n_1$ of aqueous humor and the cornea; and regulating two compensation angles α and β in a gazing direction.

14. The device as claimed in claim 13, wherein acquiring the gaze track of the target object in the movement process of the calibration point comprises:
acquiring a pupil center position and a glint center position on an eyeball in the movement process of the calibration point; and determining the gaze track of the target object according to the pupil center position and the glint center position.

* * * * *